UNITED STATES PATENT OFFICE.

PHILIP L. SYLVESTER, OF AUBURN, NEW YORK, ASSIGNOR TO WOODRUFF BROTHERS, OF SAME PLACE.

MANUFACTURE OF BUTTONS FROM PLASTIC MATERIAL.

SPECIFICATION forming part of Letters Patent No. 232,565, dated September 21, 1880.

Application filed June 16, 1880. (Specimens.)

*To all whom it may concern:*

Be it known that I, PHILIP L. SYLVESTER, of Auburn, in the county of Cayuga, and in the State of New York, have invented certain new and useful Improvements in the Manufacture of Buttons from Plastic Material; and I do hereby declare that the following is a full, clear, and exact description thereof.

The design of my invention is to enable buttons to be produced which shall have all of the beauty, finish, and appearance of inlaid work, and can be produced at a fraction of the expense necessary for the production of the latter; and to this end it consists, as an improvement in the manufacture of buttons from plastic material, in the method of producing an ornamental surface by means of mother-of-pearl, glass, stone, or other like substances placed within a face-mold and covered with plastic material, so as to produce a button having its face composed of plastic and non-plastic material, substantially as and for the purpose hereinafter specified.

In the use of my method non-plastic material, preferably mother-of-pearl, is cut by any suitable means into pieces having the desired shapes, and each piece then finished upon one face, after which one or more of said pieces are placed face downward within each face-mold and plastic material placed over the same and caused to fill said molds in the usual manner. When the plastic material has hardened the buttons are removed from the molds, and are found to possess faces composed of plastic and non-plastic material, the latter being inclosed within the former and having the appearance of the most perfect inlaid work.

Buttons thus produced have all the beauty and finish of inlaid work, are far more durable, and can be produced at a fraction of the expense necessary for the production of similar buttons by inlaying.

Having thus fully set forth the nature and merits of my invention, what I claim as new is—

As an improvement in the manufacture of buttons from plastic material, the method of producing an ornamental surface by means of mother-of-pearl, glass, stone, or other like substances placed within a face-mold and covered with plastic material, so as to produce a button having its face composed of plastic and non-plastic material, substantially as and for the purpose specified.

In testimony that I claim the foregoing I have hereunto set my hand this 10th day of June, 1880.

PHILIP L. SYLVESTER.

Witnesses:
E. D. WOODRUFF,
P. C. WOODRUFF.